Nov. 15, 1966     R. N. MARONA ETAL     3,285,477
LIQUID METERING DISPENSER

Filed April 1, 1965     3 Sheets-Sheet 1

INVENTORS
ROBERT N. MARONA
PHILIP H. HUEPENBECKER

BY *Le Fever, Sullivan & Hubbard*
ATTORNEYS

FIG. 7
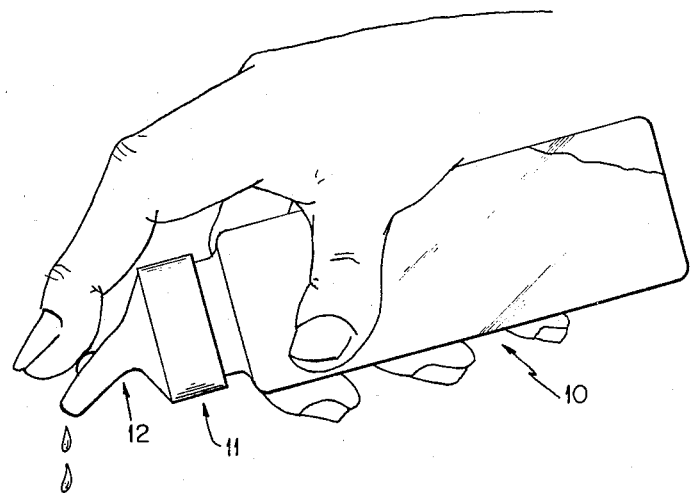
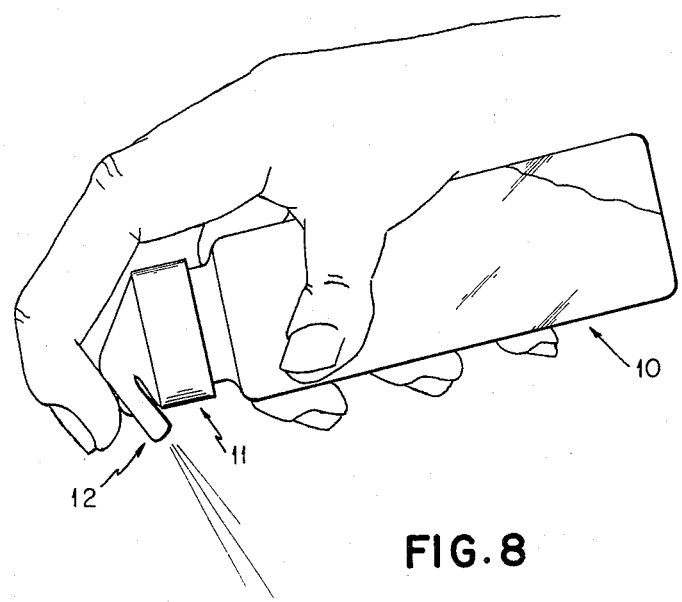
FIG. 8

Nov. 15, 1966 R. N. MARONA ETAL 3,285,477
LIQUID METERING DISPENSER
Filed April 1, 1965 3 Sheets-Sheet 3
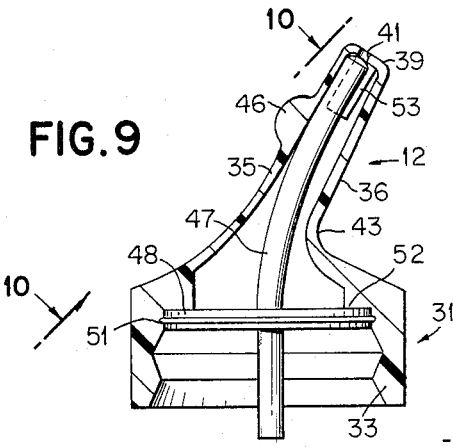
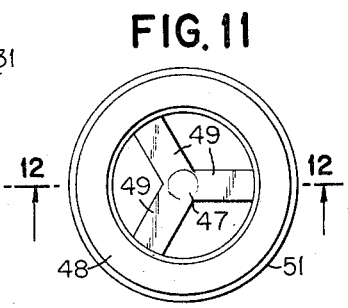
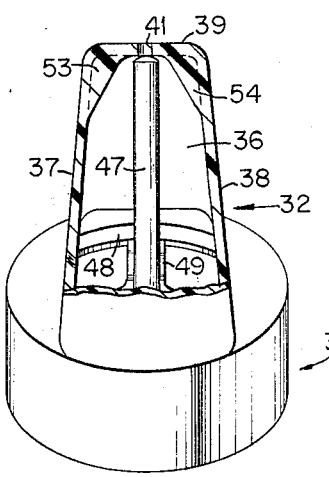
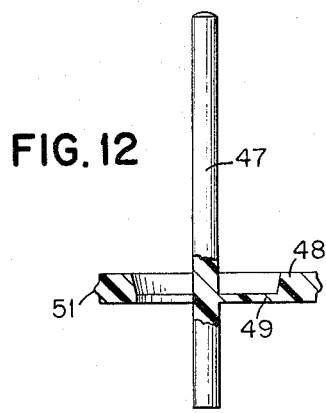
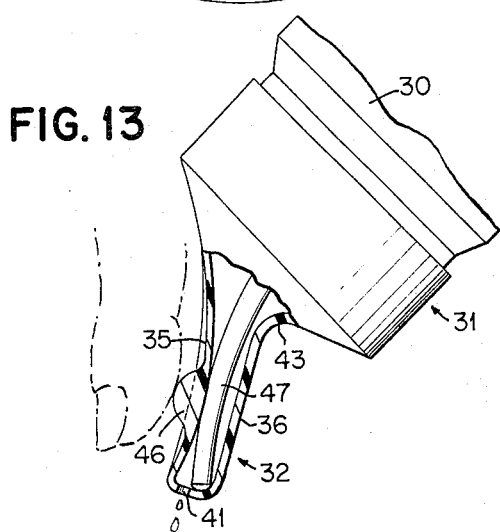
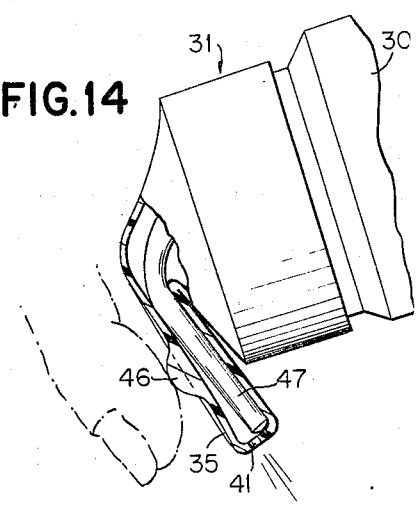

3,285,477
Patented Nov. 15, 1966

3,285,477
LIQUID METERING DISPENSER
Robert N. Marona, Scarsdale, and Philip H. Huepenbecker, White Plains, N.Y., assignors to General Foods Corporation, New York, N.Y., a corporation of Delaware
Filed Apr. 1, 1965, Ser. No. 444,610
17 Claims. (Cl. 222—213)

This invention relates generally to liquid dispensing devices adaptable for use as a closure member for a liquid container, the invention relating more particularly to such devices capable of dispensing, in response to manual actuation, different quantities of the contained liquid dependent upon the manner of actuation thereof.

There has long been a demand for a low-cost reliable dispensing device for liquids which could meter precise quantities of the liquid as desired. The demand for such devices keeps increasing as more and more new products in liquid form and in concentrated strength become available to the public at large for use in relatively small but accurately measured quantities.

The invention is herein disclosed in embodiments designed to constitute an end closure for a liquid container intended to hold a concentrated relatively low-viscosity liquid such as an artificial sweetener or the like. Due to the wide range in taste among the public at large with respect to the degree of sweetness desired for any given food product, the dispensing device provided for use with such products should ideally be capable of operating to dispense as little as one drop of the product at a time or, alternatively, a stream comprising a quantity of the product equivalent to a predetermined number of drops. For example, in the case of a product of the type above mentioned, i.e., an artificial sweetener, the quantity of its equivalent amount of sugar. Assuming that the concentration of the product is such that ten drops thereof are the equivalent of one teaspoon of sugar, then by proportioning the dimensions of the device so that when actuated in one manner ten drops of the product will be dispensed in a stream, the consumer can readily and easily obtain the equivalent of one teaspoon of sugar, or possibly two or three as the case may be. In the event that the consumer wished quantities other than those represented by full increments of ten drops each, the device could be actuated in a different manner to dispense one drop at a time thus enabling the consumer to obtain the precise quantity desired.

The invention is disclosed herein in two embodiments each of which is molded out of flexible material, preferably a plastic material such as polyethylene or the like, to form a semi-rigid structure having flexible, resilient characteristics. The structure comprises generally a bottle cap having a hollow annular base portion adapted for snap fitment with the finish of the associated container, a hollow tip or nozzle portion having a dispensing orifice and adapted for flexing to dispense the product through said orifice, and a stopper resiliently seated interiorally of said nozzle and against said orifice to seal the orifice except when the nozzle is flexed to dispsense the product. In one embodiment of the invention the stopper is formed as an integral part of the cap structure, while in another embodiment of the invention the stopper constitutes a separate member of the device. The nozzle portion of the device is designed for manual flexing, the amount of product dispensed depending on the degree of manual pressure applied thereto, a light pressure dispensing one drop at a time and a greater pressure causing maximum flexure and being effective to dispense a stream of the product constituting a predetermined quantity thereof.

It is, therefore, an object of this invention to improve upon devices for dispensing from a container liquids and metered predetermined amounts.

It is a further object of this invention to provide a liquid metering dispenser which is simplified in design, economical to manufacture and reliable in operation.

Further objects of the invention, together with the features contributing thereto and the advantages accruing therefrom, will be apparent from the following description when read in conjunction with the drawing wherein:

FIG. 7 is an operational view illustrating the drop-by-drop dispensing of the product by the device;

FIG. 8 is an operational view illustrating the dispensing in a stream of a predetermined quantity of product;

FIG. 9 is a side view in section of a dispenser structure according to a second embodiment of the invention;

FIG. 10 is an elevated view of the device, partly in section, taken from the plane 10—10 of FIG. 9;

FIG. 11 is a plan view of the separate stopper element employed in the embodiment shown in FIGS. 9 and 10;

FIG. 12 is an elevational view of the separate stopper element partly in section along the section line 12—12 of FIG. 11;

FIG. 13 is an operational view illustrating the drop-by-drop dispensing action of the device of the second embodiment.

FIG. 14 is an operational view showing the stream dispensing action of the second embodiment of the invention.

Figure 1:
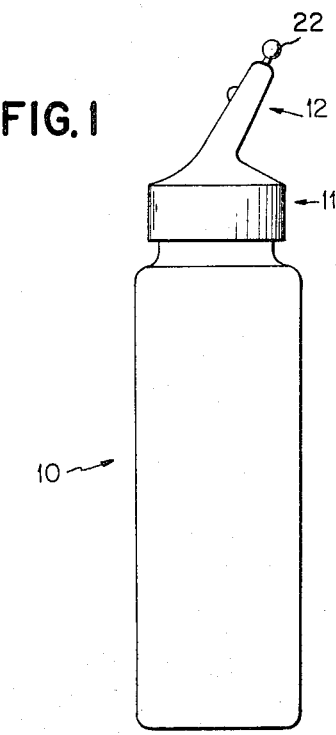
FIG. 1 is a view in side elevation of a liquid container with the metering dispenser according to this invention attached thereto.

Referring now to the drawing, FIG. 1 illustrates the device attached to the upper end of a liquid container in the form of a bottle 10, the device including an annular base portion 11 supporting an upstanding nozzle 12 the longitudinal axis of which is inclined and forms an acute angle with the axis of the base portion 11.

Figure 2:
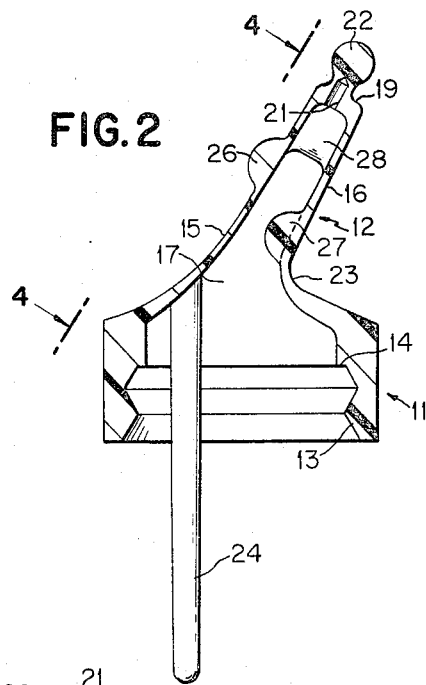
FIG. 2 is an enlarged side view in section of the dispenser shown separately from its associated container according to a first embodiment wherein the stopper is formed integrally with the cap structure.

As can be better seen in FIG. 2, the interior wall of the base portion is formed with an annular flange 13 and shoulder 14 adapted for a snap-fit tight seating engagement providing a liquid-tight seal with an appropriately shaped finish on the associated container.

Figures 4, 6:
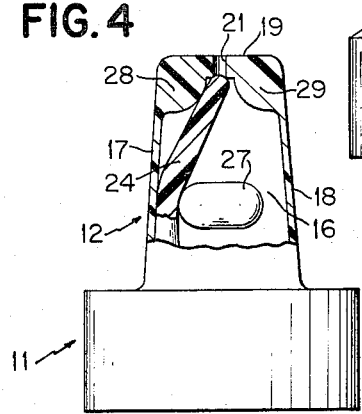
FIG. 4 is an elevational view, partly in section, of the device as shown in FIG. 3 viewed from the plane 4—4 of FIG. 2.
FIG. 6 is a view similar to FIG. 3 but showing the tip slightly flexed to unseat the stopper such as in the case when it is desired to dispense one drop at a time.

The nozzle 12 which represents a somewhat restricted continuation of the wall of the base portion 11 is defined by top and bottom walls 15, 16, respectively, side walls 17, 18, respectively, see also FIG. 4, and an end wall 19. The end wall is provided with a dispensing orifice 21 which in the manufacture of the device is sealed by a snip-off tip 22, shown only in FIGS. 1 and 2, it being understood that the tip 22 is intended to be snipped or otherwise removed by the consumer in preparation for use of the device.

Figure 3:
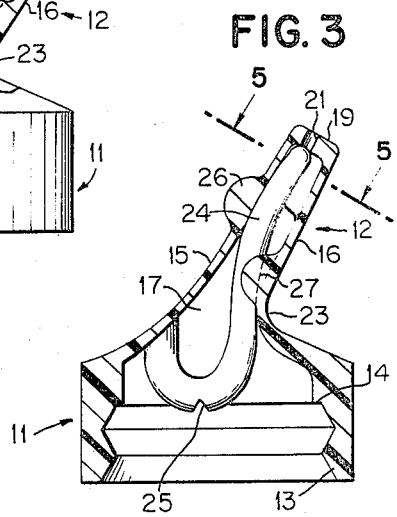
FIG. 3 is a sectional view taken along the same section as that of FIG. 2 but showing the stopper element in its normal seated position relative to the dispensing orifice.
Figure 5:
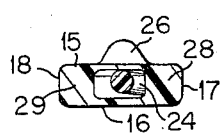
FIG. 5 is a sectional view through the nozzle of the device along the line 5—5 of FIG. 3.

It will be noted that the top wall 15 of the nozzle, as best seen in FIGS. 2 and 3, extends along a gradual arc to its point of juncture with the base portion 11. The bottom wall 16 of the nozzle, however, is formed with a relatively sharp curve 23 as it extends to its point of juncture with the base portion 11. The apex of the curve 23 serves as a fixed flexure line or axis about which the nozzle will bend upon application of manual force thereto in dispensing the product in a manner to be hereinafter more fully described.

Extending from the inner surface of the top wall 15, near its juncture with the base portion 11 is an elongate member, preferably cylindrical, which serves as a stopper 24 for sealing off the dispensing orifice 21 except when actuated to dispense the product. In FIG. 2 the stopper 24 is shown in the position it normally assumes in the manufacture or molding of the device, its operative positions being shown in FIGS. 3–6 after it has been bent back upon itself so as to dispose the tip thereof, preferably rounded off, in cooperative relationship to the dispensing orifice 21. In order to facilitate the bending of the stopper into a substantial 180° bend to dispose the tip in cooperative relation with the orifice, a small incision 25 made by a sharp instrument, hot wire, or the like, may be made in the apex of the bend if the nature of the material employed and the cross-sectional dimensions of the stopper should render such an incision desirable.

The stopper 24, when bent back upon itself in the manner above described, is constrained by the interior dimensions of the nozzle in such a manner as to yieldably bear against the interior surface of the nozzle bottom wall 16 at a point near the apex of curve 23 whence it is directed to bear against the interior surface of the top wall 15 of the nozzle which directs the tip of the nozzle into seated relation to the interior end of the dispensing orifice 21 which is located closer to top wall 15 than to bottom wall 16. Thus the stopper member 24 serves to positively seal the orifice and to prevent unintentional dispensing or leakage of the contained product through the device regardless of the attitude in which the device and container be placed.

On the exterior surface of the top wall 15 of the nozzle at the point where the stopper member 24 is directed into bearing engagement with said top wall, is preferably formed a protrusion 26 which serves as an indicator or locator for identifying the location on the nozzle at which manual force may be applied when it is desired to dispense product from the container through said metering device.

As further means for constraining the stopper 24 in an effective sealing position with respect to the dispensing orifice, a further protrusion 27 may be formed on the interior surface of the bottom wall 16 and which, as can best be seen in FIG. 4, extends over only an intermediate portion of said bottom wall so as to serve, in cooperation with one of the side walls, 17, 18 (side wall 17 in the case of FIG. 4), as a guide for retaining the stopper in effective cooperative relation with the dispensing orifice 21. As also seen in FIG. 4, the juncture of the side walls 17, 18 with the end wall 19 is achieved with an extra thickness of the material from which the device is formed so as to provide opposed arcuately shaped guides 28, 29 which act to direct the tip of the stopper 24 into proper seated engagement with the orifice 21. From the foregoing it will appear that the stopper member 24 when doubled back upon itself in the manner described and in effect wedged into seated engagement with the dispensing orifice, due to the resilient nature of the material from which it is formed, is yieldably maintained in bearing engagement with the interior surface of the top wall 15 of the nozzle so as to yieldably dispose the tip of the stopper in seated position relative to the dispensing orifice 21.

FIG. 6 illustrates the relative position of the parts when a light force is applied to the protrusion 25 in use of the device, it being understood that in FIG. 6 the container and dispensing device is not shown in an inverted position such as would be required when actually dispensing product. As will be noted from FIG. 6, a slight manual force by the finger of the user against protrusion 26 serves to yieldably flex the tip of the stopper out of seated engagement with the dispensing orifice 21, thus enabling dispensing of the product in a drop-by-drop manner, assuming of course that the container and device are inverted to cause the product to fill the interior dispensing chamber defined by the nozzle 12. This flexure of the stopper results from the slight inward flexing of the top wall 15 of the nozzle which, when transmitted to the stopper 24, causes same to bend about its point of bearing engagement with the bottom wall 16 of the nozzle to thus disposed the tip of the stopper in bearing engagement with the bottom wall 16 out of sealing engagement with the dispensing orifice 21. The slight inward flexing of the top wall 15 reduces slightly the cubic area of the interior dispensing chamber of the nozzle thus acting to force out through the dispensing orifice 21 a limited amount of the product in a drop-by-drop manner as will occur when the container is substantially inverted for product-dispensing purposes as illustrated in FIG. 7. The initial inward flexing of the top wall 15, to unseat the stopper 24, is accomplished without any substantial flexure of the bottom wall 16 of the stopper due to the greater resistance to flexure provided by the side walls 17, 18 of the nozzle portion. In order to assure the initial flexure of the top wall 15 without corresponding flexure of the bottom wall 16 upon application of light force on the protrusion 26, the top wall 15 may if desired be formed with a thickness slightly less than that of the bottom wall 16. Accordingly, when it is desired to dispense the product one drop at a time, the container is substantially inverted, at least to the position where the product will flow into the dispensing chamber of the nozzle, whereupon a slight force on the protrusion 26 will displace the tip of the stopper to expose the dispensing orifice 21, the slightly flexed wall 15 concurrently reducing the cubic area of the dispensing chamber to thus force the product in a drop-by-drop manner out through the dispensing orifice 21. Release of the pressure on protrusion 26 will enable the stopper to resume its normal seated position against the orifice and thus terminate the dispensing, even though the container is held in the substantially inverted position. When it is desired to dispense a greater, predetermined amount of the product than on a drop-by-drop basis, manual force on the protrusion 26 of a correspondingly greater extent will cause the entire nozzle portion to bend about the flexure axis at apex of curve 23 since the additional force will then exceed the limit of separate, independent flexure of the top wall 15 and will in turn be transmitted through the stopper 24 and the side walls 17, 18 to the bottom wall 16 of the nozzle which, due to the sharp curve 23 therein providing a flexure axis at a predetermined point, will bend about said flexure axis until said bottom wall 16 is doubled back upon itself, as illustrated in FIG. 8. When thus doubled back upon itself the portion of the wall 16 above the flexure axis limits against the wall portion below the flexure axis, the lower wall portion being of increased thickness, firmly supported in a relatively unflexible attitude by the base portion 11 of the device and serving as a form of anvil providing resistance to any further flexure of the bottom wall 16 about the flexure axis defined by curve 23. When in this actuated position, further force on the protrusion 26 serves to diminish the cubic area of the dispensing chamber to its minimum dimensions as determined by the positive resistance provided by the stopper 24 and the protrusion 27, thus causing product ejection of predetermined quantity in a stream through the dispensing orifice 21. Upon complete dispensing in a stream of a predetermined quantity, no further product will flow until force is relieved and again applied since the application of force to decrease the cubic area of the dispensing chamber is required to eject product through the orifice, the size of the orifice being predetermined in accordance with the viscosity of the particular product being thus packaged so as to prevent product flow, in the absence of force, even though the stopper 24 may be in unseated relation to the dispensing orifice 21.

The stopper serves a foolproof function, due to the critical tolerances surrounding the size of the dispensing orifice in relation to the product viscosity to achieve the desired result, and prevents inadvertent dispensing or leakage of the product except upon application of force to the protrusion 26. The stopper also serves as a means for transmitting applied force to cause a bending of the nozzle about the flexure axis defined by curve 23, the stopper in addition serving as a positive means for limiting the extent to which the cubic area of the dispensing chamber may be diminished under application of such force. These factors, in combination with the fact that the bending of the nozzle always occurs at a predetermined point, i.e., the flexure axis in curve 23, assures that the device when actuated to dispense a stream of the product will always dispense a stream of the same quantity.

The embodiment of the invention illustrated in FIGS. 9–14 comprises a device generally similar in outward appearance to that of the first embodiment above described and differing from the first embodiment principally with respect to the stopper member which in the second embodiment now to be described is a member molded separately from the remaining portion of the device, thus rendering the device a two-piece unit as distinguished from the single one-piece unit of the first embodiment.

Referring now to FIGS. 9–14, it will be seen that the device consists of an annular base 31 supporting an inclined nozzle portion 12, the interior wall of the base being formed with an annular flange 33 adapted to provide a snap-on fit with an appropriately shaped finish of the associated container 30. The nozzle portion is comprised of a top wall 35, a bottom wall 36, side walls 37, 38 and an end wall 39 formed with a dispensing orifice 41. The bottom wall 36 is formed with a sharp curve 43 the apex of which constitutes a flexure axis, and the top wall 35 is formed with a thickened raised portion constituting a pressure locating protrusion 46 all as heretofore described in connection with the embodiment of FIGS. 1–8.

In the embodiment presently being described, the stopper is formed or molded as a separate one-piece structure and may be made from the same or similar resilient material as that of the nozzle and base. The stopper means includes an elongate stem, preferably cylindrical and having a rounded-off tip, said stem being integrally joined to and supported from a flat ring-shaped support 48 by means of a foraminous web or membrane 49 which may take the form of a plurality or radially disposed strips. The inner circumference of the ring-shaped support 48 may be slightly tapered, as shown, and the outer circumference of the support 48 may be formed with an annular bead 51 adapted to engage in an annular recess in the inner wall of the base 31, best seen in FIG. 9, so as to provide a detachable snap-fit engagement between the stopper member and the base 31 of the device. The inner surface of said base 31 is also formed with a shoulder 52 disposed for snug engagement with the upper surface of the support 48, the structure serving to accommodate the support 48 between the base portion 31 and the finish of the associated bottle in such a manner as to provide a liquid-tight connection while at the same time enabling snap-off seperation of the device from the associated bottle 30 as well as the stopper means from the base 31.

From the foregoing it will be apparent that the stem portion 47 of the stopper means is held within the interior of the device in substantially an upright attitude by the web 49 joining it to the support 48, the web 49, due to the resilient nature of the material from which it is made, providing the stem 47 with a limited amount of longitudinal yield. When assembled with the nozzle, as best seen in FIG. 9, the upper portion of the stem 47 is deflected slightly by its engagement with the top wall 35 of the nozzle to dispose the tip of the stem 47 in sealing engagement with the dispensing orifice 41. For the purpose of restraining lateral movement of the tip of the stem 47, the interior of the nozzle portion 32 is formed with flanges 53, 54 at the juncture of the side walls 37, 38 with the end wall 39, the interior opposed surfaces of said flanges tapering in a converging direction towards the orifice so as to maintain the tip of the stem 47 in the desired registration with the orifice 41.

FIGS. 9 and 10 illustrate the relative position of the parts in a normal unactuated condition with the tip of the stopper in sealing engagement with the orifice 41, it being noted that the orifice is somewhat off center relative to the end wall 39 and lying closer to the top wall 35 than the bottom wall 36. In use, the device and container to which it is attached is substantially inverted, and in instances where a drop-by-drop dispensing of the product is desired, a slight manual force is applied to the top wall 35 on the pressure locating protrusion 46, see FIG. 13, whereupon the tip of the stopper stem 47 is unseated from the dispensing orifice 41 due to the inward flexing of the nozzle wall 35. The inward flexing of the nozzle wall 35 at the same time reduces the cubic area of the dispensing chamber within the nozzle portion thus exerting a slight pressure on the product therein contained to cause the product to be ejected through the orifice 41 in a drop-by-drop manner. The amount of pressure required to unseat the stopper to achieve drop-by-drop dispensing does not cause flexing to any substantial extent in the wall 36 of the nozzle portion.

In the event a greater amount of product were desired representing a metered predetermined quantity of product, the application of additional force on the nozzle portion will cause the parts to assume the position indicated in FIG. 14, in which position a stream of the product is dispensed, which stream consists of a predetermined quantity which remains constant and uniform each time the device is thus actuated. As seen in FIG. 14, when the additional force is applied, it is transmitted through the side walls of the nozzle portion and the stopper stem 47 to result in a bending or flexure of the nozzle wall 36 about its flexure axis at the apex of the curve 43 therein to the position where it in effect is doubled back upon itself and further flexure is prevented, the base portion 31 of the device serving as an anvil for limiting any further flexure of the wall 36 about the flexure axis. Upon reaching this condition, any additional force exerted against the protrusion 46 will serve to diminish or further reduce the cubic area of the dispensing chamber to the point where further reduction is limited positively by the side and end walls of the nozzle portion in conjunction with the stem portion 47 of the stopper, thus providing a limit to the quantity of product which can be dispensed upon any one operation of the device. Since the nozzle portion always bends at the same point, i.e., the flexure axis defined by the sharp curve 43, and a positive limit is provided to the extent which the wall 35 may be flexed relative to the wall 36, each operation of the device will result in dispensing in a stream the same predetermined quantity of the product. Upon release of force, the parts return to their normal position, as shown in FIGS. 9 and 10, by virtue of the natural resiliency of the parts resulting from the nature of the material from which they are formed.

While there has been shown and described what are considered to be preferred embodiments of the invention, it will of course be apparent that obvious changes could be made in the extact forms therein shown and described without departing from the spirit of the invention. It is therefore intended that the invention be not limited to the exact forms herein shown and described nor to anything less than the whole of the invention herein disclosed and as hereinafter claimed.

What is claimed and desired to be secured by Letters Patent is:

1. A metering device for dispensing a liquid from a container in predetermined amounts, said device being formed of a semi-rigid resilient material rendering the device flexible under a force manually applied thereto, said device comprising an annular base portion adapted to engage in a liquid-tight seal with the finish of said container, the walls of said base portion merging into respective top, bottom, and side walls of a nozzle portion substantially rectangular in cross section, said bottom wall merging with said annular base portion through a sharp curve providing a flexure axis for said nozzle portion, said nozzle portion including an end wall formed with a dispensing orifice communicating with the interior area of said nozzle, and a stopper member disposed interiorly of said nozzle portion in bearing engagement with a portion of said top wall and in yieldable sealing engagement with said orifice, said stopper member being displaced out of sealing engagement with said orifice through inward flexure of said top wall by a relatively light force applied to said top wall, said nozzle portion being yieldably bendable a predetermined extent about said flexure axis upon application of a greater force applied to said top wall, said nozzle when thus bent discharging a predetermined portion of the liquid filling the interior area of said nozzle portion.

2. The invention according to claim 1 wherein said device upon application of said relatively light force dispenses said liquid in a drop-by-drop manner.

3. The invention according to claim 1 wherein said device upon application of said greater force dispenses the predetermined amount of said liquid in a stream.

4. The invention according to claim 1 wherein said stopper member comprises an elongate stem, one end of which is anchored relative to said base portion, the other end being disposed to seal said orifice.

5. The invention according to claim 4 wherein said other end of the stopper member is rounded off to provide a convex sealing surface for seating engagement with said orifice.

6. A metering device for dispensing a liquid from a container in predetermined amounts, said device being formed of a non-rigid resilient material rendering the device flexible under a force manually applied thereto, said device comprising an annular base portion adapted to engage in a liquid-tight seal with the finish of said container, the walls of said base portion merging into respective top, bottom and side walls of a nozzle portion substantially rectangular in cross section and having a longitudinal axis inclined at an acute angle with the axis of said base portion, said bottom wall merging with said annular base portion through a sharp curve providing a flexure axis for said nozzle portion, said nozzle portion including an end wall formed with a dispensing orifice communicating with the interior of said nozzle portion, said base portion providing a limit to the extent of bending of said nozzle portion about said flexure axis, and a stopper member disposed interiorally of said nozzle portion in bearing engagement with a portion of said top wall and in yieldable sealing engagement with said orifice, said stopper member being displaced out of sealing engagement with said orifice through inward flexure of said top wall by a relatively light force applied to said top wall, said nozzle portion being yieldably bendable about said flexure axis to the extent limited by said base portion upon application of a greater force applied to said top wall, said nozzle portion upon application of force in excess of that required to bend said nozzle into limiting engagement with said base portion discharging a predetermined portion of the liquid filling the interior area of said nozzle portion.

7. The invention according to claim 6 wherein said top wall is thinner than said bottom wall to induce yieldable flexure of said top wall prior to the flexure of said bottom wall about said flexure axis.

8. The invention according to claim 6 wherein said stopper member serves to limit the extent of inward flexure of said top wall relative to said bottom wall when said nozzle portion is bent into limiting engagement with said base portion.

9. The invention according to claim 6 wherein the interior surface of said nozzle portion is formed with means for guiding said stopper member into sealing engagement with said orifice.

10. The invention according to claim 9 wherein said guiding means includes a flange at each juncture of a side wall with the end wall, each said flange having an inner surface extending in converging relation to the other in the direction of said orifice.

11. The invention according to claim 10 wherein said guide means includes a protuberance formed on the interior surface of said bottom wall near said flexure axis for restraining in cooperation with one of said side walls an intermediate portion of said stopper member.

12. The invention according to claim 6 wherein said top wall includes a protuberance formed on the upper surface thereof for indicating a preferred location for application of force to said nozzle portion.

13. The invention according to claim 1 wherein said stopper member is formed integrally with said device and includes an elongate stem depending from the interior surface of said top wall, said stem being bent into a stressed condition wherein its free end is disposed in sealing engagement with said orifice.

14. The invention according to claim 13 wherein said stem extends through a substantially reverse bend, said stem including an incision at the apex of said reverse bend to relieve stresses imparted thereto by said reverse bend.

15. The invention according to claim 1 wherein said stopper element is an independent separate element of said device, said stopper member including a supporting ring adapted to seat on the rim of said container and anchored thereto by said base portion when secured to the finish of said container.

16. The invention according to claim 15 wherein said stem is supported by said rim through a foraminous web integral with said stem and said ring.

17. The invention according to claim 16 wherein said foraminous web resiliently supports said stem to dispose the free end of said stem in yieldable sealing engagement with said orifice.

References Cited by the Examiner

UNITED STATES PATENTS

| | | | |
|---|---|---|---|
| 2,601,039 | 6/1952 | Livingstone | 222—547 X |
| 2,831,620 | 4/1958 | Schlicksupp | 222—517 |
| 3,087,656 | 4/1963 | Dougherty | 222—422 X |
| 3,193,154 | 7/1965 | Bross | 222—529 X |
| 3,221,952 | 12/1965 | De See | 222—529 X |

RAPHAEL M. LUPO, *Primary Examiner.*